United States Patent [19]

Ridenour

[11] Patent Number: 5,063,784
[45] Date of Patent: Nov. 12, 1991

[54] REFRIGERANT TRANSDUCER ASSEMBLY AND METHOD

[76] Inventor: Ralph G. Ridenour, 626 Lexington-Ontario Rd., Rte. 12, Mansfield, Ohio 44906

[21] Appl. No.: 435,264

[22] Filed: Nov. 13, 1989

Related U.S. Application Data

[63] Continuation-in-part of Ser. No. 202,554, Jun. 6, 1988, abandoned.

[51] Int. Cl.⁵ .......................... G01L 9/00; G01L 19/14
[52] U.S. Cl. ......................................... 73/756; 73/431; 73/754
[58] Field of Search .................... 73/756, 146.8, 726, 73/727, 723, 724, 725, 728, 753, 754, 431; 338/4; 361/283

[56] References Cited

U.S. PATENT DOCUMENTS

| | | | |
|---|---|---|---|
| 1,487,851 | 3/1924 | Hammond et al. | 73/146.8 |
| 1,867,779 | 7/1932 | Thompson | 73/756 |
| 3,161,061 | 12/1964 | Ames, Jr. | 73/727 |
| 3,247,719 | 4/1966 | Chelner | 73/726 |
| 4,319,492 | 3/1982 | Hewson et al. | 73/756 |
| 4,333,491 | 6/1982 | Knubley | 73/146.8 |
| 4,693,112 | 9/1987 | Ferris | 73/146.8 |

FOREIGN PATENT DOCUMENTS 542744  1/1932  Fed. Rep. of Germany .
347172  4/1931  United Kingdom .

Primary Examiner—Donald O. Woodiel
Attorney, Agent, or Firm—Pearne, Gordon, McCoy & Granger

[57] ABSTRACT

A refrigerant transducer assembly has a housing with first and second interconnected openings, and the first opening is adapted to be installed in a refrigeration system for connection to the fluid presesure to be measured. A cartridge is threaded into the second opening, and within the cartridge is a pressure transducer in a transducer chamber. The pressure transducer may need servicing and, to do so, the cartridge is unthreaded from the housing, with the initial unthreading closing a first valve controlling fluid flow between the first and second openings. Conversely, as the cartridge is reinstalled on the housing, the final threading during tightening opens the first valve. This minimizes leakage of refrigerant to atmosphere for servicing. The foregoing abstract is merely a resume of one general application, is not a complete discussion of all principles of operation or applications, and is not to be construed as a limitation on the scope of the claimed subject matter.

17 Claims, 1 Drawing Sheet

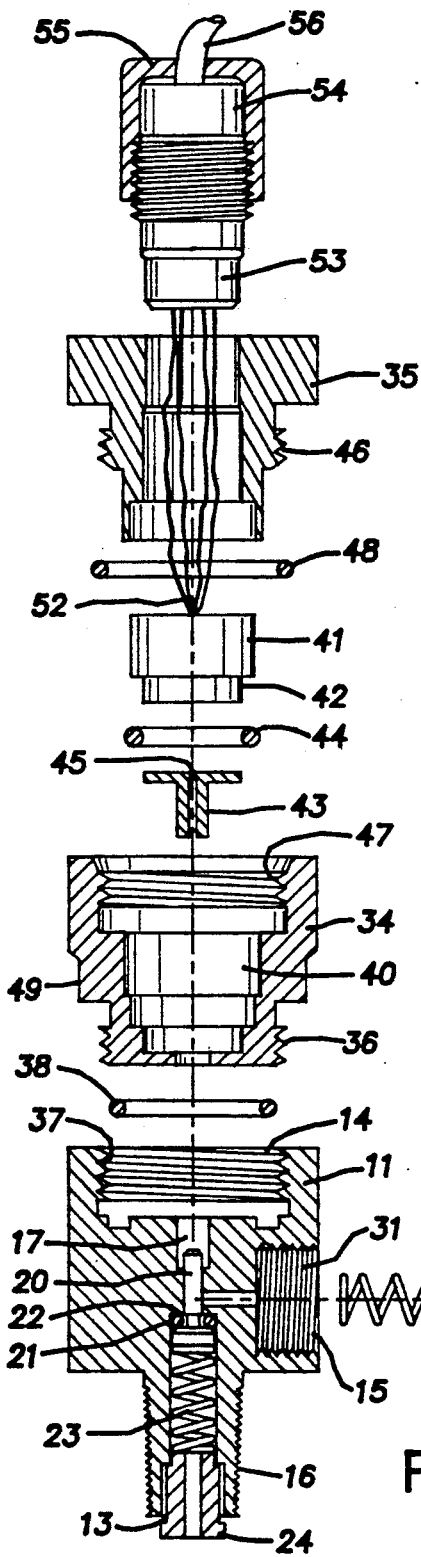
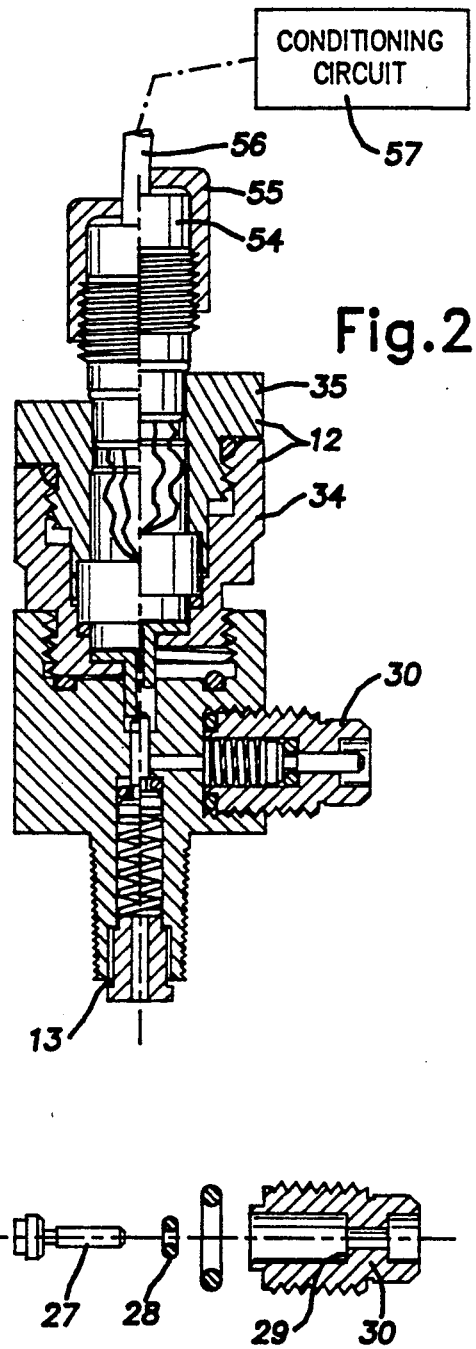
Fig.1
Fig.2

REFRIGERANT TRANSDUCER ASSEMBLY AND METHOD

BACKGROUND OF THE INVENTION

This application is a continuation-in-part of my application Ser. No. 07/202,554, filed June 6, 1988, entitled "Transducer Assembly and Operating Method", now abandoned.

In many large refrigeration systems, it is usual to utilize a pressure transducer which changes the refrigerant pressure into an electrical signal. This is usually used as an analog signal which, as it increases, progressively turns on more compressors in a refrigeration system. Also, it controls condenser fans to properly maintain head pressure. It also may be used to supply a remote gauge reading or in a control system to shut down the refrigeration system in case of loss of refrigerant pressure. This might be with a commercial refrigeration system, for example, in a food warehouse or retail food establishment. Accordingly, it could be a large refrigeration system with a large refrigerant capacity. The pressure transducer may fail occasionally and need to be replaced or serviced. In such replacement of a pressure transducer, the refrigerant pressure was often lost, reduced, or contaminated, so that the entire refrigeration system would have to be purged and recharged to the correct pressure.

A number of patents have suggested a valve block with a number of conduits and valves for selective connection of one port with another, e.g., between a pressure gauge, a pressure source, and the automobile tire or other container of the fluid pressure, namely U.S. Pat. Nos. 4,319,492; 1,487,851; 4,333,491; British Patent No. 347,172; and German Patent No. 542,744.

SUMMARY OF THE INVENTION

The problem to be solved, therefore, is how to construct and operate a transducer assembly to avoid significant loss of refrigerant pressure during changing or servicing of the pressure transducer.

This problem is solved by a refrigerant transducer assembly with a housing having first and second interconnected openings, said assembly comprising, in combination, means for installing said housing first opening in a refrigeration system for connection to the fluid pressure to be measured, a cartridge coupled with said housing in said second opening, a transducer chamber in one of said housing and said cartridge, a pressure transducer in said transducer chamber, valve means including a first valve with first and second positions operable to open or close communication between said first opening and said transducer chamber, and means to open said first valve with said cartridge coupled on said housing, whereby uncoupling said cartridge closes said first valve for servicing said transducer.

The problem is further solved by a method of operating a refrigerant transducer assembly having a housing with a first opening adapted to be connected to the fluid pressure in a refrigeration system and a pressure transducer in a transducer chamber in a removable cartridge in a second opening, and valve means in said housing operable to open or close communication between said first opening and said transducer chamber, said method comprising the steps of actuating said valve means to open communication between said first opening and said transducer chamber by the securing of said removable cartridge on said housing, and the removing of said cartridge from said housing actuating said valve means closed to permit access to said pressure transducer without any significant loss of pressure in said refrigeration system.

Accordingly, an object of the invention is to provide a transducer assembly wherein the pressure transducer may be changed or serviced without any significant loss of refrigerant pressure.

Another object of the invention is to provide a transducer assembly with a cartridge which may be readily removed for replacement or servicing and the act of removal of the cartridge simultaneously closes a valve so that the transducer may be serviced without any significant loss of refrigerant pressure.

Other objects and a fuller understanding of the invention may be had by referring to the following description and claims, taken in conjunction with the accompanying drawing.

BRIEF DESCRIPTION OF THE DRAWING

FIG. 1 is an exploded, longitudinal sectional view of a transducer assembly embodying the invention; and FIG. 2 is a longitudinal sectional view of the assembled transducer assembly.

DESCRIPTION OF THE PREFERRED EMBODIMENT

FIGS. 1 and 2 show a transducer assembly 10 constructed and operable in accordance with the invention. The assembly includes generally a housing 11 and a cartridge 12. The housing 11 has first, second, and third openings 13, 14, and 15, respectively. The first opening 13 has male threads 16 for installing the housing 11 in a refrigeration system for connection of the first opening 13 to the fluid pressure to be measured. The first and second openings 13 and 14 are coaxial and interconnected by a conduit 17. The first opening 13 receives a first valve, which includes a valve stem 20 and which controls communication between the first and second openings 13 and 14. The valve stem 20 is a form of poppet valve and carries an O-ring 21 to seat on a shoulder 22 in the housing 11. A spring 23 supplies the means to urge the valve stem 20 toward a closed condition, and the spring is compressed by an apertured plug 24 which has a press fit in the opening 13.

The third opening 15 communicates with the conduit 22 and may be termed a side port. A second valve is provided in this third opening 15, and this includes a valve stem 27 which carried an O-ring 28 which seats against a shoulder 29 in an apertured and threaded plug 30. This plug 30 threads into female threads 31 at the third opening 15.

The cartridge 12 includes generally a cartridge body 34 and a cartridge cap 35. The cartridge body 34 has male threads 36 as a form of coupling with the housing 11. In this case, these threads are received in female threads 37 at the housing second opening 14 and sealed by an O-ring 38. When the cartridge body 34 is installed on the housing 11, the combination thereof establishes a transducer chamber 40 which receives a pressure transducer 41. In the preferred embodiment, this transducer chamber 40 is within the cartridge body 34. An abutment 42 is carried on the pressure transducer and abuts a valve actuator 43, which is adapted to engage the valve stem 20. An O-ring 44 seals the pressure transducer 41 within the transducer chamber 40. The cartridge cap 35 has male threads 46 to be received in threads 47 in the cartridge body 34. An O-ring 48 seals the cap to the cartridge body 34. Wrench flats 49 are provided on the cartridge body 34.

The pressure transducer 41 may be any of the usual types, e.g., a silicon diaphragm with a Wheatstone bridge mounted thereon for compression and tension of the various arms of the bridge, and in such case, usually four conductors 52 are provided leading from the Wheatstone bridge of the pressure transducer to a multi-pin socket 53. This socket is mounted in the upper end of the cartridge cap 35 and is adapted to receive a multi-pin plug 54 held in place by a threaded cap 55. A multi-conductor cable 56 leads from the plug 54 to a conditioning circuit 57. This may include an alarm system or a shutdown system should refrigerant pressure be lost from the refrigeration system into which the housing 11 is threaded. This may be a large refrigeration system with multiple compressors and multiple loads, such as freezer compartments and display cases, for example, in a supermarket. Should the pressure be lost due to a malfunction, the system should be shut down and an alarm sent to an appropriate address and the conditioning circuit 57 will accomplish this. The conditioning circuit 57 may be remote, as shown, or may be screwed directly on the top of the transducer 41 in place of the cap 55.

A component which is most apt to fail in the system is the pressure transducer 41 which needs to be serviced or replaced. The present invention permits speedy repair by simply removing the cartridge 12 and substituting a new cartridge. All this may be accomplished in ten or fifteen seconds. Suppose a signal has been received that refrigeration pressure has been lost. A pressure gauge may be applied to the side port 15 to determine if the pressure really is lost or whether it is within operating range. As the pressure gauge is applied against the threaded plug 30, it has a valve actuator to engage and depress the valve stem 27, thus opening this valve so that the pressure of the refrigeration system at the opening 13 may be gauged. Once it has determined that the pressure is satisfactory, then it may be assumed that the pressure transducer 41 has failed and should be replaced. To accomplish this, the cap 55 is removed and the multi-pin plug 54 removed from the socket 53. Then the housing 11 may be held stationary and a wrench applied to the wrench flats 49 to remove the cartridge 12 from the housing 11. The initial unthreading of the cartridge means that the valve actuator 43 rises, permitting the valve stem 20 to rise and close against the shoulder 22. Thus, the first valve 20-22 is closed by the initial unthreading of the cartridge 12 from the housing 11. This is shown in the right half of FIG. 2. A replacement cartridge 12 with a new pressure transducer may then be threaded into the housing 11 and the multi-pin plug 54 reinserted in the socket and held in place by the threaded cap 55 so that the substitution is complete. The tightened condition is shown in the left half of FIG. 2. In this tightened condition, the valve 20-22 is opened, permitting the refrigeration system pressure to be applied to the transducer chamber 40, and hence to the pressure transducer 41.

If one has only a new pressure transducer 41 rather than a complete cartridge 12, the cartridge cap 35 may be unscrewed from the cartridge body 34. The initial unthreading will permit the pressure transducer 41 and the valve actuator 43 to rise with the rising movement of the cartridge cap 35, aided by the force of the spring 23. This closes the first valve 20-22 so that there is a minimum of loss of refrigerant by this unthreading action. With the cartridge cap 35 removed, the pressure transducer will be removed with the cap 35 and the old pressure transducer 41 may be unsoldered from the multi-pin socket 53 and a new one soldered in its place, thus permitting reassembly, which will again open the valve 20-22.

The valve actuator 43 has a restricted orifice 45 to limit the flow of refrigerant during the initial unthreading of the cartridge 12. Also, the flow of refrigerant is limited by the helical path between the male and female threads. Together, these two make a restricted passage so that no substantial amount of refrigerant is lost during the removal and replacement of the cartridge. This is important in today's concern about loss of the ozone layer due to fluorocarbons. The fact that the small amount of pressure does leak past the threads effectively prevents the cartridge 12 from being blown out of the housing 11. The unit is completely sealed by the various O-rings, and can be immersed in water and still be operable.

In the preferred embodiment shown, the transducer chamber 40 is within the cartridge 12 and the construction is such that at least when the cartridge is removed, the pressure transducer 41 is removed with it.

The pressure disclosure includes that contained in the appended claims, as well as that of the foregoing description. Although this invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention as hereinafter claimed.

What is claimed is:

1. A transducer assembly with a housing having first and second interconnected openings, said assembly comprising, in combination:

means for installing said housing first opening in a pressurized system for connection to the fluid pressure to be measured;

a cartridge coupled with said housing in said second opening, the cartridge including a cartridge body operatively connectable and disconnectable with the housing, and a cartridge cap operatively connectable and disconnectable and in fluid communication with the cartridge body;

a transducer chamber in one of said housing and said cartridge;

a pressure transducer in said transducer chamber for converting a pressure to an electrical signal;

valve means including a first valve with first and second positions operable to open or close communication between said first opening and said transducer chamber; and means to open said first valve with said cartridge coupled on said housing and means to close said first valve by starting to disconnect either the cartridge body from the housing or the cartridge cap from the cartridge body.

2. A transducer assembly as set forth in claim 1, wherein said first and second openings are coaxial.

3. A transducer assembly as set forth in claim 1, wherein said transducer chamber is in said cartridge.

4. A transducer assembly as set forth in claim 1, wherein said pressure transducer is removable with said cartridge.

5. A transducer assembly as set forth in claim 1, wherein said first valve is in said housing.

6. A transducer assembly as set forth in claim 1, including a multi-contact socket in said cartridge for connection to a multi-contact plug.

7. A transducer assembly as set forth in claim 1, wherein said cartridge body, cartridge cap, and housing are connected by threaded means.

8. A transducer assembly as set forth in claim 7, wherein the start of unthreading of said cartridge body or said cartridge cap closes said first valve.

9. A transducer assembly as set forth in claim 1, including a third opening in said housing and a second valve in said valve means disposed in said third opening and controlling communication between said first and third openings.

10. A transducer assembly as set forth in claim 1, including means urging said first valve closed, and a valve actuator acting between said cartridge and said first valve to actuate said first valve to an open condition with said cartridge coupled to said housing.

11. A transducer assembly as set forth in claim 1, wherein said pressure transducer and at least a portion of said transducer chamber are removable with said cartridge.

12. A method of operating a transducer assembly having a housing with a first opening adapted to be connected to the fluid pressure in a pressurized system and a pressure transducer in a transducer chamber in a removable cartridge in a second opening, the cartridge including a cartridge body operatively connectable and disconnectable to the housing and a cartridge cap operatively connectable and disconnectable with the cartridge body and in fluid communication therewith, and valve means in said housing operable to open or close communication between said first opening and said transducer chamber, said method comprising the steps of:
   actuating said valve means to open communication between said first opening and said transducer chamber by the securing of said removable cartridge on said housing; and
   starting to remove said cartridge body from said housing or starting to remove said cartridge cap from said cartridge body which closes said valve means to permit access to said pressure transducer without any significant loss of pressure in said pressurized system.

13. The method as set forth in claim 12, including a coupling between said cartridge and said housing; and the step of uncoupling actuating said valve closed.

14. The method as set forth in claim 12, including a threaded connection between said cartridge and said housing.

15. The method as set forth in claim 14, wherein the final tightening of said threaded cartridge onto said housing opens said valve; and
   the initial unthreading of said threaded cartridge from said housing closes said valve for a minimum of gas leakage along said threads.

16. The method as set forth in claim 12, wherein the cartridge includes a cartridge body threaded to a cartridge cap to form the transducer chamber, and including the steps of removal of the cartridge cap from said cartridge body actuating said valve closed for servicing of said pressure transducer.

17. A pressure transducer assembly with a housing having first and second interconnected openings, said assembly comprising, in combination:
   means for installing said housing first opening in a pressure system for connection to the fluid pressure to be measured;
   a cartridge coupled with said housing in said second opening including a cartridge body operatively connectable and disconnectable to the housing and a cartridge cap operatively connectable or disconnectable from the cartridge body;
   a transducer chamber in one of said housing and said cartridge;
   a pressure transducer in said transducer chamber for converting a pressure to an electrical signal;
   valve means including a first valve with first and second positions operable to open or close communication between said first opening and said transducer chamber, a third opening in said housing in fluid communication with the first and second openings so that the pressure in the housing may be measured without access to the first and second openings so that the pressure in the housing may be compared to the electrical signal of the pressure transducer to determine if the pressure transducer is functioning properly; and
   means to open said first valve with said cartridge coupled on said housing, whereby starting to disconnect said cartridge body from said housing or said cartridge cap from said cartridge body closes said first valve.

* * * * *